United States Patent [19]
Tsukada

[11] Patent Number: 5,854,948
[45] Date of Patent: Dec. 29, 1998

[54] PHOTOGRAPHIC LENS FOCUSING SYSTEM AND METHOD WHICH COMPENSATES FOR SIZE OF APERTURE

[75] Inventor: Shinichi Tsukada, Toride, Japan

[73] Assignee: Nikon Corporation, Tokyo, Japan

[21] Appl. No.: 859,213

[22] Filed: May 20, 1997

[30]  Foreign Application Priority Data

May 20, 1996  [JP]  Japan .................................. 8-148660

[51] Int. Cl.$^6$ .................................................. G03B 13/22
[52] U.S. Cl. ............................................. 396/93; 396/509
[58] Field of Search ................................ 396/63, 64, 91, 396/93, 89, 509

[56]  References Cited

U.S. PATENT DOCUMENTS

| | | | |
|---|---|---|---|
| 4,303,323 | 12/1981 | Imai et al. | 354/166 |
| 4,344,679 | 8/1982 | Yagi et al. | 396/93 |
| 4,473,287 | 9/1984 | Fukuhara et al. | 354/409 |
| 4,890,133 | 12/1989 | Ogawa et al. | 354/402 |

FOREIGN PATENT DOCUMENTS 62-227108  10/1987  Japan .

*Primary Examiner*—Russell E. Adams

[57]  ABSTRACT

A focus setting system for a camera in which a photographer can observe a focused subject image in a viewfinder and which corrects the focus prior to exposure such that a photographed picture is in focus. Specifically, the focusing system corrects for errors introduced by varying apertures. The focusing system has a photographic lens which has a memory for storing focus error data which represents focusing adjustment values from an open aperture to a number of predetermined apertures. A focus detection device detects a focused state of the photographic lens using a portion of the incident light rays of the photographic lens. A first drive unit drives the photographic lens by calculating a focus drive amount which achieves focus at open aperture. The focus drive amount is calculated from the focus error data and the focus state detected by the focus detection device. A second drive unit drives the photographic lens by calculating a second focus drive amount which sets the focus for a predetermined aperture based on the focus error data and the focused state detected by the focus detection device.

13 Claims, 2 Drawing Sheets

PHOTOGRAPHIC LENS FOCUSING SYSTEM AND METHOD WHICH COMPENSATES FOR SIZE OF APERTURE

CROSS-REFERENCE TO RELATED APPLICATIONS

This application claims the benefit of Japanese Application No. 08-148660 which is hereby incorporated by reference.

BACKGROUND OF THE INVENTION

The present invention relates to a focusing system of a camera. The focus position of a photographic lens varies with size of an aperture of the photographic lens and the size of an aperture of the focusing system. The size of the aperture of a photographic lens is given in terms of an F-stop, also called an F-number or F-value. The F-stop is the focal length of a lens divided by the diameter of the aperture (as seen from the front of the lens). The F-stop is written like F8, which means the aperture diameter is ⅛th the focal length. Lenses are typically referred to by a combination of the focal length of the lens and the maximum aperture of the lens, e.g. 300 mm, F2.8. Thus, the maximum aperture (also referred to herein as the "open aperture" or "fully open aperture") of a 300 mm, F2.8 lens would be approximately 107 mm (more accurately F2.8 is actually F2√2, making the maximum aperture 106.07 mm). The F-stop varies inversely with the size of the aperture.

In a camera having interchangeable photographic lenses, such as an SLR camera, which possesses an automatic focus detection device, the photographic lens is usually installed and used in the camera in the "normal mode" wherein the aperture is open, i.e. at maximum aperture with the smallest F-stop (F2.8 in the above example). When an exposure is taken the aperture is stopped down. This is largely because the photographer can more clearly observe the subject through the lens with the aperture fully open. The brightness of the image in the viewfinder is inversely proportional to the F-stop squared. As the aperture is stopped-down, light beams which would otherwise reach the focus detection device become eclipsed, diminishing the ability of the focus detecting device to detect a focused state of the photographic lens.

Accordingly, while the photographer typically observes the subject in the normal mode, with the maximum aperture, at the time of exposure the aperture is stopped-down to an appropriate value. The actual aperture used at the time of exposure may be set by the camera, based, for example, on a clarity of the subject, or set manually by the photographer.

When the photographer observes the subject in the viewfinder, the aperture is at the maximum F-stop. Thereafter, based on the output of the focus detection device, which has its own characteristic aperture, the photographer, or camera, sets the desired focus. Because the focus is set with the aperture at the maximum F-stop, the photographed picture is not in focus when exposed with a stopped-down aperture. However, if the lens is set so that the photographed picture would be in focus, based upon the aperture at the time of exposure, the image in the viewfinder may be out of focus.

A "preview mode" (also called a "depth of field preview") is a function by which the photographer can observe the subject image in the viewfinder with the photographic lens stopped-down to a selected F-stop. In known cameras having a preview function, the setting of the focus is still performed at an open aperture. Thus, during the preview, the photographer observes an unfocused image in the viewfinder.

Japanese Laid-Open Patent Application 62-227108 discloses a focus detection device which detects focus at an aperture generally equal in magnitude to the detection aperture of the photographic lens.

SUMMARY OF THE INVENTION

The inventors of the present invention have realized that if focus error data relating the open aperture to the detection aperture and a plurality of apertures is stored in a memory in a photographic lens, focusing can be corrected with respect to different apertures (including an open aperture) based on a focus detection device detecting a focused state of the photographic lens at the detection aperture.

Accordingly, it is an object of the present invention to allow a photographer to invariably observe the subject image, in focus, in the viewfinder in both normal and preview modes.

It is also an object of the present invention to provide a focusing system for a camera in which the image in the viewfinder in a normal or preview mode are in focus and the photographed picture is also in focus.

Additional objects and advantages of the invention will be set forth in part in the description which follows, and, in part, will be obvious from the description, or may be learned by practice of the invention.

Objects of the present invention are achieved in a focusing system for a camera having a photographic lens, the focusing system having focusing error data indexed by F-stop, a focus detection device which detects a focused state of the photographic lens using a portion of the incident light rays of the photographic lens, a first drive unit which drives the photographic lens by a focus drive amount calculated at maximum aperture using the focused state detected by the focus detection device, and a second drive unit which drives the photographic lens based on a focusing drive amount to correct the focus at a predetermined aperture, calculated using the focus error data and the state of focus detected by the focus detection device.

Objects of the present invention are also achieved in a focusing system for a camera having a photographic lens, the focusing system comprising a memory storing focusing error data with respect to at least two apertures, a focus detection device which detects a focused state of the photographic lens using a portion of the incident light rays of the photographic lens, the focus detection device possessing a characteristic detection aperture, a first drive unit which drives the photographic lens, at maximum aperture, a focus drive amount based on the focus error data, the magnitude of the detection aperture, and the focused state detected by the focus detection device and a second drive unit which drives the photographic lens an amount based on a calculated focus error of a first aperture and second aperture, using the focus error data, and a control unit which provides the aperture data of the first aperture and second aperture to the second drive unit when the second drive unit is caused to operate, and controls the first drive unit and second drive unit.

Objects of the present invention are achieved in a focusing system for a lens comprising a memory storing focusing error data indicating an amount of focus error between an open aperture and a predetermined aperture, a focus detector which has a characteristic detection aperture and detects a focused state of the lens, a first drive unit which calculates a focus drive amount which focuses the lens for an open aperture, based on the focus error data, the magnitude of the detection aperture and the focused state detected by the focus detector, and drives the lens based on the first focus drive amount and a second drive unit which calculates a second focus drive amount which focuses the lens at the predetermined aperture, based on the focus error data, the magnitude of the detection aperture and the focus state detected by the focus detector, and drives the lens based on the second focus drive amount.

Objects of the present invention are also achieved in a focusing system for a lens comprising a memory storing focus error data for at least two aperture values relating the focus at each of the at least two aperture values to the focus at the fully open aperture, a focus detector which detects a focused state of the lens using a portion of the incident light rays of the lens, the focus detector possessing a detection aperture, a first drive unit which calculates a first focus drive amount, which focuses the lens for a maximum aperture, based on focus error data, the magnitude of the detection aperture, and the focused state detected by the focus detection device, and drives the lens based on the first drive amount, a second drive unit which calculates a focus error between a first aperture and a second aperture based on the focus error data and drives the lens based on the calculated focus error, and a control unit which controls the first drive unit and the second drive unit. The control unit provides the aperture data of the first aperture and second aperture to the second drive unit to cause the second drive unit to operate.

Objects of the present invention are also achieved in a focusing apparatus for correcting a focus of a lens to compensate for differences in aperture, the focusing apparatus comprising a focus detection device which outputs a focusing signal, a first drive unit which focuses the lens at maximum aperture, and a second drive unit which focuses the lens for use at an aperture smaller than maximum aperture.

Objects of the present invention are also achieved in a camera comprising a lens, an aperture adjustable to restrict the light passing through the lens, a focus adjustment unit to move the lens so as to focus the lens, a focus detection device to output the focus of the lens at a detection aperture, a memory unit to store focus correction data relating the focus of the lens at the maximum aperture to the focus at each of a plurality of stopped-down apertures, a first drive unit which focuses the lens for use at the maximum aperture based on the output of the focus detection device and the focus correction data and a second drive unit which focuses the lens for use at a stopped-down aperture based on the focus correction data.

Objects of the present invention are also achieved in a method of focusing a lens comprising detecting focus of a lens at a detection aperture, retrieving focus connection data indicating an amount to correct the focus of the lens to focus at a maximum aperture based on the detected focus of the lens and focusing the lens for a maximum aperture based on the detected focus and the retrieved focus connection data.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
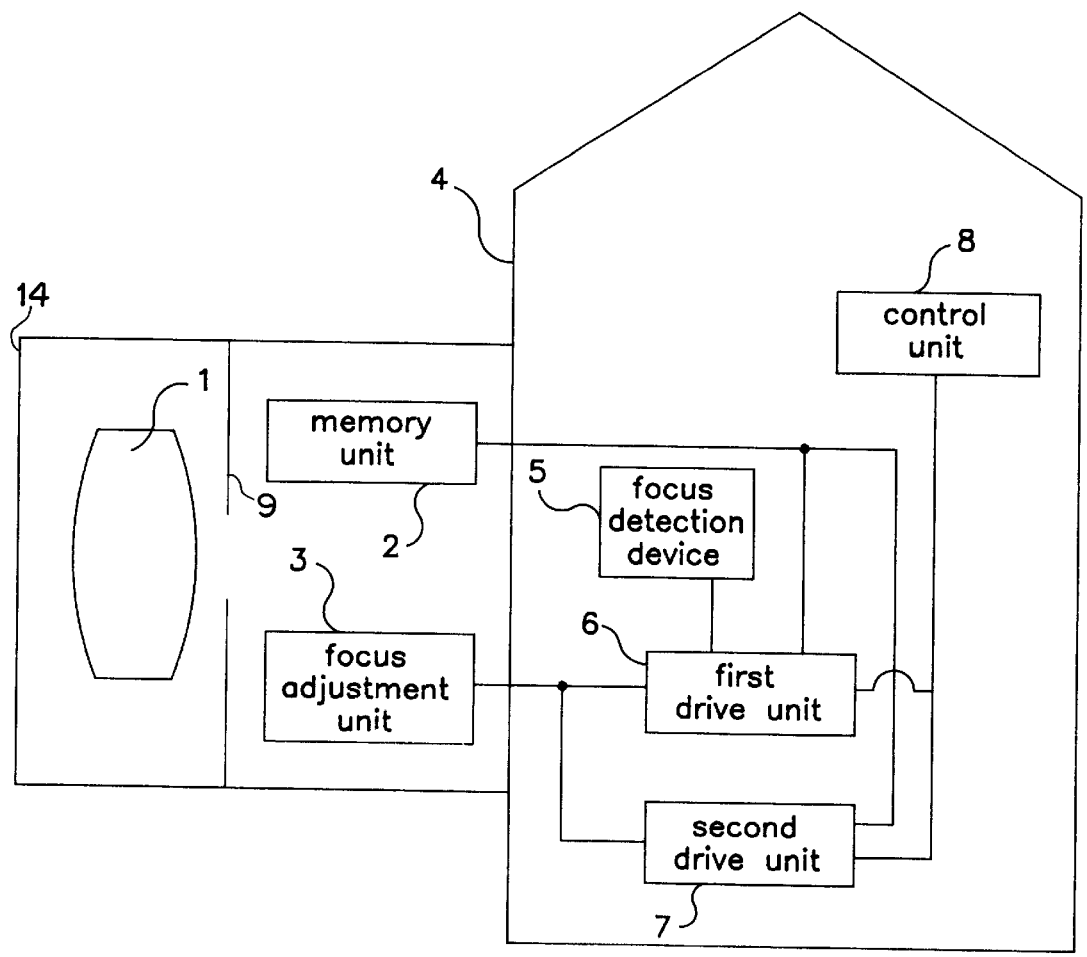
FIG. 1 is a block diagram showing a focus setting system of a camera according to the preferred embodiment of the present invention.

Reference will now be made in detail to the present preferred embodiment of the present invention, examples of which are illustrated in the accompanying drawings, wherein like reference numerals refer to like elements throughout.

FIG. 1 is a block diagram showing a focus setting system of a camera according to the preferred embodiment of the present invention. A lens barrel 14 is mounted on a camera body 4. The lens barrel 14 has a photographic lens 1, an aperture 9, a focus adjustment unit 3 and a memory unit 2. The camera body 4 is provided with a focus detection device 5, a first drive unit 6, a second drive unit 7, and a control unit 8. The memory unit 2 stores focus difference data representing an error correction in focus adjustment for settings of the aperture 9 at the maximum F-stop to a plurality of F-stop values of the aperture 9. The focus adjustment unit 3 adjusts focus of the photographic lens 1 based on commands from the first drive unit 6 and the second drive unit 7. Normally, the aperture 9 of the photographic lens 1 is at the maximum F-stop, i.e. fully open, to allow the photographer to view a bright image in a viewfinder (not shown).

Figure 2:
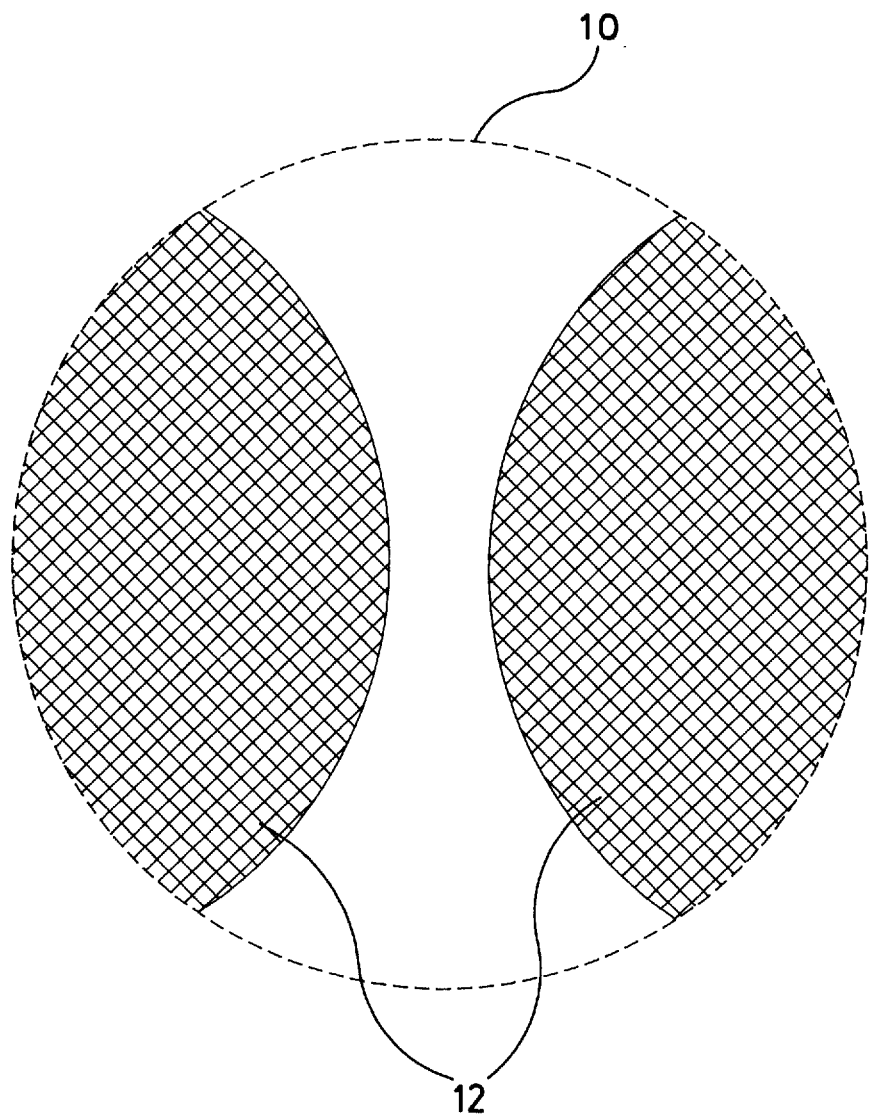
FIG. 2 is a schematic diagram which illustrates a detection aperture of the focus detection device according to the preferred embodiment of the present invention.

FIG. 2 is a schematic diagram which illustrates a detection aperture of the focus detection device according to the preferred embodiment of the present invention. The focus detection device 5 (see FIG. 1) is preferably a phase difference type of focus detector which has a detection aperture 12 shown by the cross-hatching in FIG. 2. The focus detection device 5 performs focus detection on light received in the detection aperture 12 having a magnitude, also called a characteristic aperture, shown by the dotted line 10. The light received in the detection aperture 12 is a sub-set of all the light beams which have passed through the aperture 9 of the photographic lens 1. The memory unit 2 stores a value, as focus adjustment data, relating the output of the focus detection device 5, at the characteristic aperture, to correct focus at the maximum F-stop of the aperture 9.

Referring once again to FIG. 1, the first drive unit 6 is electrically linked to the control unit 8 and the focus detection device 5 in the camera body 4. The first drive unit 6 is also electrically linked to the memory unit 2 of the lens barrel 14 and electrically or mechanically linked to the focus adjustment unit 3 of the lens barrel 14. The first drive unit 6 receives an operating instruction from the control unit 8 and drives the focus adjustment unit 3 of the lens barrel 14 in accordance therewith. The first drive unit 6 calculates the focus drive amount based on the magnitude of the detection aperture (indicated by a broken line 10 in FIG. 2), the focus detection data provided by the focus detection device 5 and the focus difference data stored in the memory unit 2. The focus drive amount is calculated so as to set the focus with the aperture 9 being fully open.

The second drive unit 7 is electrically linked to the control unit 8 of the camera body 4. The second drive unit is electrically linked to the memory unit 2 in the lens barrel 14 and electrically or mechanically linked to the focus adjustment unit 3 in the lens barrel 14. The second drive unit 7 receives operating instructions and aperture data from the control unit 8 and calculates a focus drive amount based on the focus difference data from the memory unit 2. Subsequently, the second drive unit 7 drives the photographic lens 1 via the focus adjustment unit 3.

In the following example, the maximum F-stop of the lens barrel 14 is F2.8. The focus difference between the maximum aperture (i.e., F2.8) and F4 is 50 $\mu$m, the focus difference between the maximum aperture and F8 is 150 μm. These values are stored as focus difference data in the memory unit 2.

One way to obtain the focus difference values is through empirical testing. For example, when the magnitude 10 of the detection aperture 12 of the focus detection device 5 is about F8, the focus detection device 5 outputs a focus signal having a displacement amount (or focus difference) of 0 for an aperture of F8. Another measurement is taken at the maximum aperture F2.8. The focus detection device 5 detects a difference between the focus signal at the maximum aperture F2.8 and at F8, which in our example is about +150 μm.

During operation, the focus is set for a subject using the photographic lens 1 at the maximum aperture. The output of the focus detection device 5 is X μm (corresponding to the aperture of the focus detection device 5). Based on the example above, if the focus adjustment unit 3 of the lens barrel 14 drives the photographic lens 1 to displace the focus −(X−150)μm, the subject is in focus at the maximum aperture of F2.8. This amount (−(X−150)μm) is calculated by the first drive unit 6.

The first drive unit 6 obtains focus difference data from the memory unit 2 of the lens barrel 14, and obtains the magnitude of the detection aperture (in this case F8) from the focus detection device 5. By indexing using the F-number, the amount of correction can be obtained (150 μm in this case) from the memory unit 2. The first drive unit 6 then calculates the focus drive amount (in this case −(X−150) μm) from the output of the focus detection device 5 (X μm in this example) and the correction amount (150 μm in this example), obtained from the memory unit 2. The photographic lens 1 is then driven the calculated focus drive amount via the focus adjustment unit 3.

Next, suppose the photographic lens 1 is used to photograph a subject, i.e. complete an exposure, with the aperture stopped-down to F5.6. Because the focus of the photographic lens 1 is set for the fully open aperture (F2.8), the focus must be displaced 100 μm to the minus side based on the focus difference between a fully open aperture (F2.8) and the aperture 9 stopped-down to F5.6. If the photographic lens 1 is driven so as to be displaced by +100 μm (from the above example values), the focus of the photographic lens 1 is set for correctly imaging the subject at an aperture of F5.6. This operation is effected by the second drive unit 7. Namely, the second drive unit 7 obtains, from the control unit 8, first aperture data (in this case F2.8, or open) and second aperture data (in this case, F5.6) and the focus difference data from the memory unit 2. The second drive unit 7 then calculates an amount (+100 μm in this case), and drives the photographic lens 1 by the calculated amount, via the focus adjustment unit 3, prior to exposure.

The photographer normally observes the image through the viewfinder, as focused by the first drive unit at maximum aperture as described above. But suppose that the photographer wishes to preview (i.e., a depth-of-field preview) with the aperture 9 stopped-down to F4. If the aperture 9 is simply stopped-down, while the focus of the photographic lens 1 is set at the maximum aperture of F2.8, the photographer observes the subject image 50 μm out of focus to the minus side. The photographic lens 1 needs to be driven by +50 μm before the subject is in focus at an aperture of F4. The second drive unit 7 obtains first aperture data (corresponding to fully open, i.e., F2.8 in this case) from the control unit 8, and second aperture data (in this case, F4) from control unit 8. The focus difference data is obtained from the memory unit 2. The second drive unit 7 then calculates a drive amount (+50 μm in this case), and drives the photographic lens 1 by the drive amount.

When the photographer finishes the preview, the second drive unit 7 obtains the first aperture data (in this case, F4), the second aperture data (in this case, the maximum aperture) and the focus difference data. The second drive unit then calculates a drive amount (in this case, −50 μm), and drives the photographic lens 1 by the drive amount. Accordingly, the photographer is able to observe a subject image in focus in either the normal mode or the preview mode.

Although the first preferred embodiment of the present invention has been described with respect to a specific configuration, it will be recognized that the first embodiment is not limited to the specific configuration. In the foregoing example, the photographic lens 1 stored focus difference data for each different F-number (F4, F5.6, F8) in addition to data for the fully open aperture (F2.8). During normal photographic operations, a wide range of F-numbers, for example, F4.5, are regularly used. Data for these F-numbers can either be stored in the memory unit 2 or calculated as follows.

Suppose that the focus differences between a fully open aperture and two additional F-numbers, FX1 and FX2, are stored as PX1 and PX2. The focus difference of PX of an aperture FX midway between F1 and F2 would be approximately $$PX = r \cdot PX1 + (1-r) \cdot PX2.$$

Where r is $$r = (FX2^2 - FX^2)/(FX2^2 - FX1^2).$$

One advantage of calculating intermediate values is that it is not necessary to store intermediate values in the photographic lens 1. However one of ordinary skill in the art will recognize that the relationship between the focus differences and the various F-numbers may be stored, as opposed to separately storing each data item.

In accordance with the preferred embodiment of the present invention, first drive unit 6 drives the photographic lens 1 by calculating a focus drive amount which sets the focus at open aperture, from the focus state detected by the focus detection device, and from the focus difference data. The second drive unit 7 drives the photographic lens 1 by calculating the focus drive amount which sets the focus at open aperture, from the focus stated detected by the focus detection device, and from the focus difference data by operation of the second drive unit directly before exposure, so as to set the focus from the fully open aperture to the aperture used at the time of exposure or during preview mode. In accordance with the preferred embodiment of the present invention, the photographer can observe a correctly focused subject image during normal operation, and which is also correctly focused on the resulting exposure.

The first drive unit 6 is operated during normal use when the photographer is observing in the viewfinder at the fully open aperture. The second drive unit 7 sets the focus from the fully open aperture to the aperture used during preview mode, and directly after the preview mode has ended, resets the focus to a fully open aperture from the aperture during the preview mode. In this way, the photographer can observe a focused subject image whether normally at the fully open aperture, or during preview mode with a stopped-down aperture.

Although preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A focusing system for a lens comprising:

a memory storing focusing error data indicating an amount of focus error between an open aperture and a predetermined aperture;

a focus detector which detects a focused state of the lens;

a first drive unit which calculates a focus drive amount which focuses the lens for an open aperture, based on the focus error data and the focused state detected by said focus detector, and drives the lens based on the first focus drive amount; and a second drive unit which calculates a second focus drive amount which focuses the lens at the predetermined aperture, based on the focus error data and the focus state detected by said focus detector, and drives the lens based on the second focus drive amount.

2. A focusing system for a lens comprising:

a memory storing focus error data for at least two aperture values relating the focus at each of the at least two aperture values to the focus at the fully open aperture;

a focus detector which detects a focused state of the lens using a portion of the incident light rays of the lens, said focus detector possessing a detection aperture;

a first drive unit which calculates a first focus drive amount, which focuses the lens for a maximum aperture, based on focus error data, the magnitude of the detection aperture, and the focused state detected by said focus detection device, and drives the lens based on the first focus drive amount;

a second drive unit which calculates a focus error between a first aperture and a second aperture based on the focus error data and drives the lens based on the focus error that is calculated; and a control unit which controls said first drive unit and said second drive unit, the control unit provides the aperture data of the first aperture and second aperture to said second drive unit to cause said second drive unit to operate.

3. A focusing system according to claim 2, wherein the first aperture is a full open aperture and the second aperture is a stopped-down aperture, and wherein said control unit operates the first drive unit to enable a user to observe an image in a viewfinder, and operates the second drive unit to focus the lens at the second aperture prior to exposure.

4. A focusing system according to claims 2, wherein said control unit, when a user is viewing in a normal mode, controls the first drive unit, and when the user is viewing a preview at a desired aperture, controls the second drive unit by providing aperture data to the second drive unit indicating that the first aperture is an open aperture and the second aperture is the desired aperture.

5. A focusing apparatus for correcting a focus of a lens to compensate for differences in aperture, said focusing apparatus comprising:

a focus detection device which outputs a focusing signal;

a first drive unit which focuses the lens at maximum aperture; and a second drive unit which focuses the lens for use at an aperture smaller than the maximum aperture.

6. A focusing apparatus as in claim 5, wherein said focus detection device has a detection aperture and said first drive unit compensates for a focus difference between the detection aperture and the maximum aperture.

7. A focusing apparatus as in claim 5, wherein said second drive unit focuses the lens by correcting the focus as set by said first drive unit.

8. A focusing apparatus as in claim 5, further comprising:

a memory for storing focus correction data relating the focus at each of at least two aperture values to the focus at maximum aperture and wherein said second drive unit uses the focus correction data to focus the lens.

9. A focusing apparatus as in claim 5, further comprising:

a control unit to activate said first drive unit during a normal mode and to activate said second drive unit prior to a preview mode.

10. A focusing apparatus as in claim 9, wherein said control unit activates said second drive unit prior to an exposure operation.

11. A camera comprising:

a lens;

an aperture adjustable to restrict the light passing through said lens;

a focus adjustment unit to move the lens so as to focus said lens;

a focus detection device to output the focus of said lens at a detection aperture;

a memory unit to store focus correction data relating the focus of said lens at the maximum aperture to the focus at each of a plurality of stopped-down apertures;

a first drive unit which focuses said lens for use at the maximum aperture based on the output of said focus detection device and the focus correction data; and a second drive unit which focuses said lens for use at a stopped-down aperture based on the focus correction data.

12. A method of focusing a lens comprising:

detecting focus of a lens at a detection aperture;

retrieving focus connection data indicating an amount to correct the focus of the lens to focus at a maximum aperture based on the detected focus of the lens; and focusing the lens for a maximum aperture based on the detected focus and the retrieved focus correction data.

13. A method of focusing a lens, as in claim 12, further comprising:

identifying a desired stopped down aperture;

retrieving second focus correction data indicating an amount to correct the focus of the lens at maximum aperture to focus as the desired stopped-down aperture; and focusing the lens for the desired stopped-down aperture based on the retrieved second focus correction data.

* * * * *